US012596599B2

(12) United States Patent (10) Patent No.: US 12,596,599 B2
Rameshbabu et al. (45) Date of Patent: Apr. 7, 2026

(54) FRAMEWORK FOR FAILURE DETECTION, FORECASTING AND REMEDIATION COMBINING DOMAIN-SPECIFIC TELEMETRY AND CUSTOMIZED MACHINE LEARNING MODELS

(71) Applicant: Dell Products L.P., Round Rock, TX (US)

(72) Inventors: Arun Rameshbabu, Torbay (CA); Shaul Dar, Petach Tikva (IL); David Sydow, Merrimack, NH (US); Shreyans Jasoriya, Brighton, MA (US); Keith Drummond, Glanmire (IE); Nicolas Leazard, Hudson, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/794,144

(22) Filed: Aug. 5, 2024

(65) Prior Publication Data

US 2026/0037352 A1 Feb. 5, 2026

(51) Int. Cl.
*G06F 11/30* (2006.01)
*G06F 11/00* (2006.01)
(Continued)

(52) U.S. Cl.
CPC ............. *G06F 11/008* (2013.01); *G06N 5/04* (2013.01); *G06F 11/3058* (2013.01); *G06N 3/045* (2023.01)

(58) Field of Classification Search
CPC ..... G06F 11/008; G06F 11/3058; G06N 5/04; G06N 3/045
See application file for complete search history.

(56) References Cited

U.S. PATENT DOCUMENTS 10,645,147 B1    5/2020  Gulbrandsen
11,537,459 B2 * 12/2022  Sethi ..................... G06F 18/214
(Continued)

FOREIGN PATENT DOCUMENTS

AU        2014259538 B2 * 12/2015  ......... H04L 41/0631

OTHER PUBLICATIONS

Wikipedia's feature (Machine Learning) Historical version published Jun. 10, 2024 https://en.wikipedia.org/w/index.php?title=Feature_(machine_learning)&oldid=1228325586 (Year: 2024).*

*Primary Examiner* — Joseph O Schell
(74) *Attorney, Agent, or Firm* — BainwoodHuang

(57) ABSTRACT

Techniques for providing a centralized framework for forecasting IT component failures. The techniques include collecting raw telemetry data specific to different IT component domains, and transforming the telemetry data into structured telemetry data. The techniques include performing feature engineering on the structured telemetry data to obtain features relevant to IT component failures in each IT component domain, and, for each IT component domain, using the features to generate a customized ML model. The techniques include accessing features relevant to IT component failures in each IT component domain, accessing a customized ML model for forecasting IT component failures in the IT component domain, and forecasting IT component failures in the IT component domain using the customized ML model. By providing a centralized framework for forecasting IT component failures that combines the use of domain-specific telemetry data with customized ML models, improved fault resilience and reduced system downtime can be achieved.

20 Claims, 4 Drawing Sheets

(51) Int. Cl.
    *G06N 5/04*       (2023.01)
    *G06N 3/045*     (2023.01)

(56)           References Cited

U.S. PATENT DOCUMENTS

| | | | |
|---|---|---|---|
| 11,604,682 | B2 | 3/2023 | He et al. |
| 11,657,008 | B2 | 5/2023 | Vankamamidi et al. |
| 11,954,468 | B2 | 4/2024 | Fong et al. |
| 11,960,763 | B2 | 4/2024 | Dar et al. |
| 12,067,280 | B2 | 8/2024 | Dar et al. |
| 12,079,101 | B2 | 9/2024 | Dar et al. |
| 2009/0228409 | A1* | 9/2009 | Eklund ................. G06F 11/008 |
| | | | 703/2 |
| 2021/0264025 | A1* | 8/2021 | Givental ............... G06F 18/285 |
| 2021/0342205 | A1* | 11/2021 | Mcguinness .......... G06F 3/0616 |
| 2022/0197868 | A1 | 6/2022 | Dovzhenko et al. |
| 2022/0350484 | A1 | 11/2022 | Vankamamidi et al. |
| 2022/0351744 | A1* | 11/2022 | Krishnan ............... G06N 3/045 |
| 2023/0229733 | A1 | 7/2023 | Dar et al. |
| 2024/0086736 | A1* | 3/2024 | Kwartler ............ G06F 11/0793 |
| 2024/0346150 | A1 | 10/2024 | Dar et al. |

* cited by examiner

Failure detection, forecasting, and
remediation framework 118

FRAMEWORK FOR FAILURE DETECTION, FORECASTING AND REMEDIATION COMBINING DOMAIN-SPECIFIC TELEMETRY AND CUSTOMIZED MACHINE LEARNING MODELS

BACKGROUND

Storage systems include processing circuitries and storage arrays containing storage disks and/or drives, such as solid-state drives (SSDs) and hard disk drives (HDDs). The processing circuitries perform input/output (IO) operations in response to storage IO requests issued over a network by host or client computers. The IO operations (e.g., read operations, write operations) cause data blocks, data pages, data files, or other data elements specified in the storage IO requests to be read from or written to volumes, logical units, filesystems, or other storage objects maintained on the storage disks/drives. The storage systems may be monitored to predict or forecast whether storage disks/drives will fail within future time periods. Such predictions or forecasts of storage disk/drive failures may rely upon machine learning (ML) classification techniques along with prediction reliability scoring.

SUMMARY

In recent years, storage systems and other standalone or clustered information technology (IT) systems have evolved and increased in complexity in the IT space. The ability to detect, forecast, and provide remediation of component failures has therefore become essential for maintaining seamless operation of IT systems. However, although techniques have been provided for forecasting potential storage disk/drive failures, there is a need for a unified or centralized framework for detection, forecasting, and remediation of component failures across a range of IT system component domains that includes not only storage disk/drive domains, but also other IT system component domains, such as networking domains, server domains, and so on.

Techniques are disclosed herein for providing a unified or centralized framework for detection, forecasting, and remediation of IT system component failures (the "framework") that combines the use of domain-specific telemetry data with customized machine learning (AI/ML) models. The framework can be implemented in one or more analytics server computers (the "analytics server(s)"), which can be deployed as part of a cloud infrastructure, or maintained locally at a dark site or other such site not connected to a public/private cloud or network. The framework can encompass a plurality of executable software/firmware systems, components, and microservices, including a queuing system, a telemetry processing component, a feature engineering component, a machine learning (ML) component, an inferencing microservice, and a visuals microservice and portal. The framework can also encompass one or more databases and/or data lake houses.

In the disclosed techniques, the framework's queuing system can collect (e.g., in real-time) raw unstructured telemetry data pertaining to multiple components of one or more IT systems in a customer install base. The raw unstructured telemetry data can be specific to, or associated with, multiple different IT system component domains, such as networking domains, server domains, storage disk/drive domains, and so on. In one embodiment, raw unstructured telemetry data specific to different IT system component domains can be collected at the queuing system in response to multiple requests for the telemetry data. In another embodiment, raw unstructured telemetry data can be "pushed" to the queuing system, without requiring any requests to "pull" the telemetry data. In the disclosed techniques, for each IT system, the queuing system can place raw unstructured telemetry data specific to each IT system component domain in a separate data queue.

In the disclosed techniques, the framework's telemetry processing component can retrieve or extract, from separate data queues of the queuing system, raw unstructured telemetry data specific to multiple different component domains of each IT system, clean the raw unstructured telemetry data, and, for each component domain of each IT system, transform the unstructured telemetry data into structured telemetry data. In the disclosed techniques, the framework's feature engineering component can receive, from the telemetry processing component, the structured telemetry data specific to the different component domains of each IT system, perform feature engineering on the structured telemetry data to obtain features (or attributes) relevant to component failures in the different IT system component domains, and store the obtained features, and optionally the structured telemetry data used to obtain the features, in the framework's database. In the disclosed techniques, the framework's ML component can receive, from the feature engineering component, the features relevant to component failures in the different IT system component domains, and, for each IT system component domain, train, validate, and test an ML algorithm using at least some of the features information, and generate a customized ML model based on the ML algorithm for forecasting potential component failures in the IT system component domain.

In the disclosed techniques, the framework's inferencing microservice can access, from the database, recently obtained features relevant to component failures in the multiple different component domains of each IT system, access customized ML models for forecasting potential component failures in the different IT system component domains, and forecast, by model inference, potential component failures using the customized ML models. In the disclosed techniques, the framework's visuals microservice and portal can receive, from the inferencing microservice, information pertaining to the performance and/or forecasting results of each customized ML model, access, from the database, the features information used by each customized ML model to perform model inference, and provide real-time metrics, data visualizations, and/or notifications of potential IT system component failures, all of which can be monitored by human users to gain insights from the model inference performed by the customized ML models. By providing a unified or centralized framework for detection, forecasting, and remediation of IT system component failures that combines the use of domain-specific telemetry data with customized ML models, improved fault resilience, enhanced troubleshooting capability, and reduced system downtime in a customer install base can be achieved.

In certain embodiments, a method includes providing a computer-executable framework for forecasting potential component failures of at least one IT system, in which the computer-executable framework includes a queuing system, a telemetry processing component, a feature engineering component, an ML component, and an inferencing microservice. The method includes receiving, at the queuing system, telemetry data specific to multiple different IT system component domains of the at least one IT system, and placing, in separate data queues of the queuing system, the telemetry data specific to the multiple different IT system component domains. The method includes, for each separate data queue containing telemetry data specific to a respective IT system component domain from among the multiple different IT system component domains, extracting, by the telemetry processing component, the telemetry data from the separate data queue, generating, by the feature engineering component, feature data based on the extracted telemetry data specific to the respective IT system component domain, and forecasting, by the inferencing microservice, a potential failure of a component in the respective IT system component domain based on an output of a customized ML model. The customized ML model operates on recently obtained feature data for the respective IT system component domain, and is trained using the generated feature data for the respective IT system component domain. The method includes, in response to forecasting the potential failure of the component in the respective IT system component domain, performing a remedial action.

In certain arrangements, the method includes placing first telemetry data specific to a first IT system component domain in a first data queue of the queuing system, and placing second telemetry data specific to a second IT system component domain in a second data queue of the queuing system.

In certain arrangements, the method includes extracting the first telemetry data from the first data queue, and extracting the second telemetry data from the second data queue.

In certain arrangements, the method includes generating first feature data based on the first telemetry data specific to the first IT system component domain, and generating second feature data based on the second telemetry data specific to the second IT system component domain.

In certain arrangements, the customized ML model is trained using a first customized ML model trained using the first feature data for the first IT system component domain, and a second customized ML model trained using the second feature data for the second IT system component domain.

In certain arrangements, the method includes forecasting, by a first instance of the inferencing microservice, a potential failure of a first component in the first IT system component domain based on an output of the first customized ML model. The first customized ML model operates on recently obtained feature data for the first IT system component domain. The method includes forecasting, by a second instance of the inferencing microservice, a potential failure of a second component in the second IT system component domain based on an output of the second customized ML model. The second customized ML model operates on recently obtained feature data for the second IT system component domain.

In certain arrangements, the method includes placing a greater amount of the first telemetry data in the first data queue, and placing a lesser amount of the second telemetry data in the second data queue. The method includes automatically scaling-up the first instance of the inferencing microservice for forecasting the potential failure of the first component in the first IT system component domain based on the greater amount of the first telemetry data in the first data queue, without scaling the second instance of the inferencing microservice for forecasting the potential failure of the second component in the second IT system component domain.

In certain arrangements, the method includes forecasting, by the scaled-up first instance of the inferencing microservice, the potential failure of the first component in the first IT system component domain.

In certain arrangements, the method includes maintaining the second instance of the inferencing microservice as an unscaled instance of the inferencing microservice, and forecasting, by the unscaled instance of the inferencing microservice, the potential failure of the second component in the second IT system component domain.

In certain embodiments, a system includes a memory configured to store program instructions for a framework for forecasting potential component failures of at least one IT system. The framework includes a queuing system, a telemetry processing component, a feature engineering component, an ML component, and an inferencing microservice. The processing circuitry is configured to execute the program instructions out of the memory to receive, at the queuing system, telemetry data specific to multiple different IT system component domains of the at least one IT system, and place, in separate data queues of the queuing system, the telemetry data specific to the multiple different IT system component domains. The processing circuitry is configured to execute the program instructions out of the memory, for each separate data queue containing telemetry data specific to a respective IT system component domain from among the multiple different IT system component domains, to extract, by the telemetry processing component, the telemetry data from the separate data queue, to generate, by the feature engineering component, feature data based on the extracted telemetry data specific to the respective IT system component domain, and to forecast, by the inferencing microservice, a potential failure of a component in the respective IT system component domain based on an output of a customized ML model. The customized ML model operates on recently obtained feature data for the respective IT system component domain, and is trained using the generated feature data for the respective IT system component domain. The processing circuitry is configured to execute the program instructions out of the memory, in response to forecasting the potential failure of the component in the respective IT system component domain, to perform a remedial action.

In certain arrangements, the processing circuitry is configured to execute the program instructions out of the memory to place first telemetry data specific to a first IT system component domain in a first data queue of the queuing system, and to place second telemetry data specific to a second IT system component domain in a second data queue of the queuing system.

In certain arrangements, the processing circuitry is configured to execute the program instructions out of the memory to extract the first telemetry data from the first data queue, and to extract the second telemetry data from the second data queue.

In certain arrangements, the processing circuitry is configured to execute the program instructions out of the memory to generate first feature data based on the first telemetry data specific to the first IT system component domain, and to generate second feature data based on the second telemetry data specific to the second IT system component domain.

In certain arrangements, the customized ML model is trained using a first customized ML model trained using the first feature data for the first IT system component domain, and a second customized ML model trained using the second feature data for the second IT system component domain.

In certain arrangements, the processing circuitry is configured to execute the program instructions out of the memory to forecast, by a first instance of the inferencing microservice, a potential failure of a first component in the first IT system component domain based on an output of the first customized ML model. The first customized ML model operates on recently obtained feature data for the first IT system component domain. The processing circuitry is configured to execute the program instructions out of the memory to forecast, by a second instance of the inferencing microservice, a potential failure of a second component in the second IT system component domain based on an output of the second customized ML model. The second customized ML model operates on recently obtained feature data for the second IT system component domain.

In certain arrangements, the processing circuitry is configured to execute the program instructions out of the memory to place a greater amount of the first telemetry data in the first data queue, and to place a lesser amount of the second telemetry data in the second data queue. The processing circuitry is configured to execute the program instructions out of the memory to automatically scale-up the first instance of the inferencing microservice for forecasting the potential failure of the first component in the first IT system component domain based on the greater amount of the first telemetry data in the first data queue, without scaling the second instance of the inferencing microservice for forecasting the potential failure of the second component in the second IT system component domain.

In certain arrangements, the processing circuitry is configured to execute the program instructions out of the memory to forecast, by the scaled-up first instance of the inferencing microservice, the potential failure of the first component in the first IT system component domain.

In certain arrangements, the processing circuitry is configured to execute the program instructions out of the memory to maintain the second instance of the inferencing microservice as an unscaled instance of the inferencing microservice, and to forecast, by the unscaled instance of the inferencing microservice, the potential failure of the second component in the second IT system component domain.

In certain embodiments, a computer program product includes a set of non-transitory, computer-readable media having program instructions that, when executed by processing circuitry, cause the processing circuitry to perform a method including providing a computer-executable framework for forecasting potential component failures of at least one IT system. The computer-executable framework includes a queuing system, a telemetry processing component, a feature engineering component, an ML component, and an inferencing microservice. The method includes receiving, at the queuing system, telemetry data specific to multiple different IT system component domains of the at least one IT system, and placing, in separate data queues of the queuing system, the telemetry data specific to the multiple different IT system component domains. The method includes, for each separate data queue containing telemetry data specific to a respective IT system component domain from among the multiple different IT system component domains, extracting, by the telemetry processing component, the telemetry data from the separate data queue, generating, by the feature engineering component, feature data based on the extracted telemetry data specific to the respective IT system component domain, and forecasting, by the inferencing microservice, a potential failure of a component in the respective IT system component domain based on an output of a customized ML model. The customized ML model operates on recently obtained feature data for the respective IT system component domain, and is trained using the generated feature data for the respective IT system component domain. The method includes, in response to forecasting the potential failure of the component in the respective IT system component domain, performing a remedial action.

In certain arrangements, the computer program product's method includes placing first telemetry data specific to a first IT system component domain in a first data queue of the queuing system, and placing second telemetry data specific to a second IT system component domain in a second data queue of the queuing system. The method includes placing a greater amount of the first telemetry data in the first data queue, and placing a lesser amount of the second telemetry data in the second data queue. The method includes automatically scaling-up a first instance of the inferencing microservice for forecasting the potential failure of the first component in the first IT system component domain based on the greater amount of the first telemetry data in the first data queue, without scaling a second instance of the inferencing microservice for forecasting the potential failure of the second component in the second IT system component domain.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for providing a unified or centralized framework for detection, forecasting, and remediation of information technology (IT) system component failures. The framework can include a plurality of executable software/firmware systems, components, and microservices, including a queuing system, a telemetry processing component, a feature engineering component, a machine learning (ML) component, an inferencing microservice, and a visuals microservice and portal. The framework's queuing system can collect (e.g., in real-time) raw unstructured telemetry data specific to, or associated with, multiple different component domains of at least one IT system. The framework's telemetry processing component can extract the raw unstructured telemetry data specific to the different component domains of the IT system from separate data queues of the queuing system, and, for each IT system component domain, transform the unstructured telemetry data into structured telemetry data. The framework's feature engineering component can receive the structured telemetry data specific to each IT system component domain, and perform feature engineering on the structured telemetry data to obtain features (or attributes) relevant to component failures in the IT system component domain. The framework's ML component can receive the features relevant to the component failures, and, for each IT system component domain, use at least some of the features information to train, validate, and test an ML algorithm, and to generate a customized ML model based on the ML algorithm. The framework's inferencing microservice can access recently obtained features relevant to component failures in each IT system component domain, access a customized ML model for forecasting potential component failures in the IT system component domain, and forecast, by model inference using the customized ML model, one or more potential component failures in the IT system component domain. The framework's visuals microservice and portal can receive information pertaining to the performance and/or forecasting results of each customized ML model, access information pertaining to features used by each customized ML model to perform model inference, and provide real-time metrics, data visualizations, and/or notifications of potential IT system component failures, all of which can be monitored by human users to gain insights from the model inference performed by the customized ML models. By providing a unified or centralized framework for detection, forecasting, and remediation of IT system component failures that combines the use of domain-specific telemetry data with customized ML models, improved fault resilience, enhanced troubleshooting capability, and reduced system downtime in a customer install base can be achieved.

Figure 1:
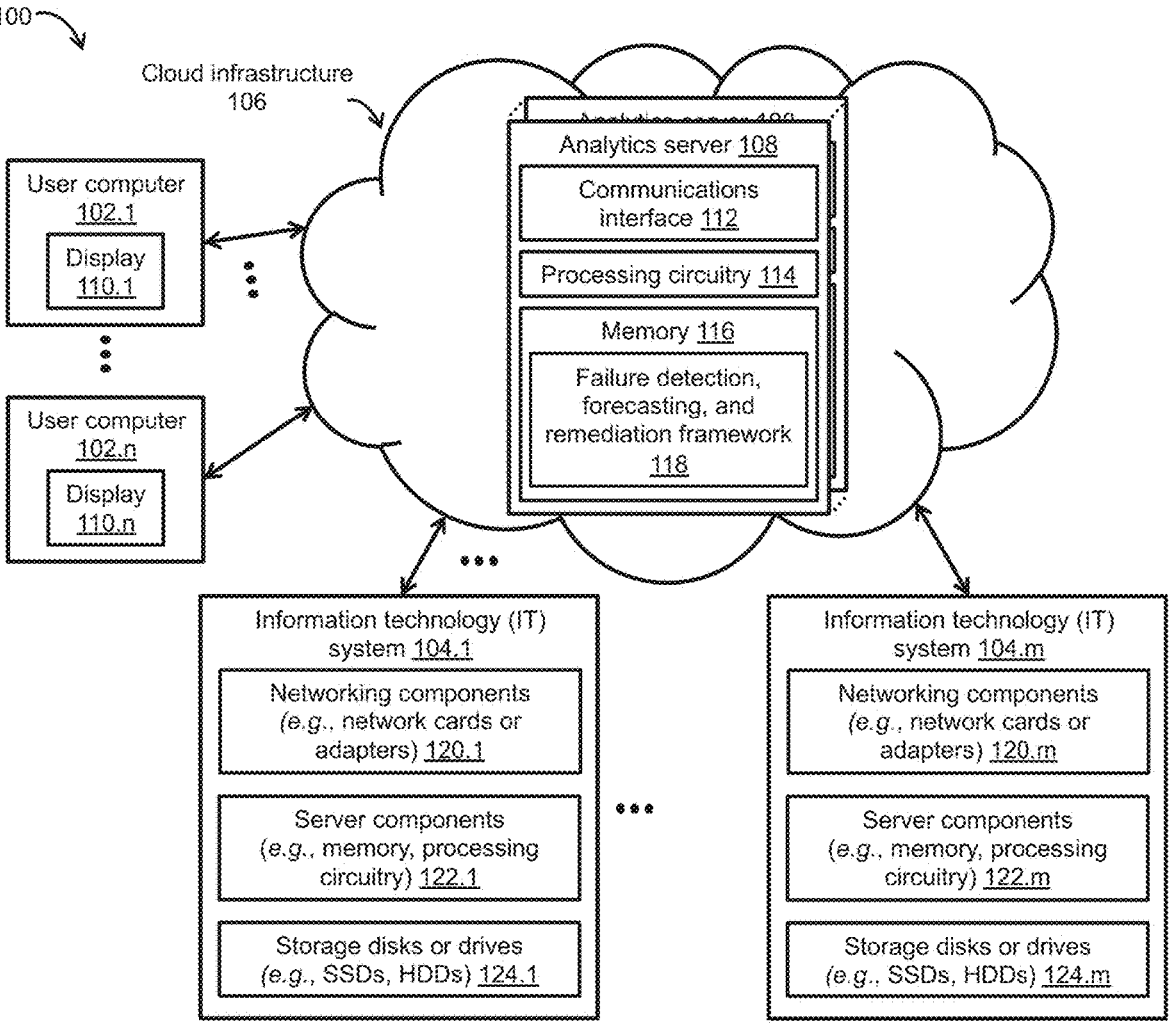
FIG. 1 is a block diagram of an exemplary system environment, in which techniques can be practiced for providing a unified or centralized framework for detection, forecasting, and remediation of information technology (IT) system component failures that combines the use of domain-specific telemetry data with customized machine learning (AI/ML) models.

FIG. 1 depicts an illustrative embodiment of an exemplary system environment 100 for providing a unified or centralized framework for detection, forecasting, and remediation of IT system component failures. As shown in FIG. 1, the system environment 100 can include a plurality of user computers 102.1, . . . , 102.n and a plurality of IT systems 104.1, . . . , 104.m, all of which can be communicably coupled, over a cloud infrastructure 106, to at least one analytics server 108. In one embodiment, the plurality of user computers 102.1, . . . , 102.n can correspond to a plurality of storage client computers (the "storage clients"), and the plurality of IT systems 104.1, . . . , 104.m can correspond to a plurality of storage systems. Each such storage client can provide, over the cloud infrastructure 106, storage input/output (IO) requests (e.g., small computer system interface (SCSI) commands, network file system (NFS) commands) to one or more of the plurality of storage systems. The storage IO requests (e.g., write requests, read requests) can direct each such storage system to write and/or read datasets including data blocks, data pages, data files, or any other suitable data elements, to/from logical units (LUs), volumes (VOLs), virtual volumes (VVOLs) (e.g., VMware® VVOLs), filesystems, or any other suitable storage objects, maintained on one or more storage disks and/or drives (e.g., solid state drives (SSDs), hard disk drives (HDDs)). The plurality of user computers 102.1, . . . , 102.n can include, or be associated with, a plurality of displays 110.1, . . . , 110.n, respectively. Each of the plurality of IT systems 104.1, . . . , 104.m can include a plurality of hardware, software, and/or firmware components configured into multiple different IT system component domains. For example, the IT system 104.1 may include a plurality of network components (e.g., network cards or adapters) 120.1 configured into a networking domain, a plurality of server components (e.g., memory, processing circuitry) 122.1 configured into a server domain, and a plurality of storage disks and/or drives (e.g., SSDs, HDDs) 124.1 configured into a storage disk/drive domain. Likewise, the IT system 104.m may include a plurality of network components (e.g., network cards or adapters) 120.m configured into a networking domain, a plurality of server components (e.g., memory, processing circuitry) 122.m configured into a server domain, and a plurality of storage disks and/or drives (e.g., SSDs, HDDs) 124.m configured into a storage disk/drive domain.

As shown in FIG. 1, the analytics server 108 can include a communications interface 112, processing circuitry 114, and a memory 116. The communications interface 112 can include an Ethernet interface, an InfiniBand interface, a Fiber Channel (FC) interface, or any other suitable interface. The communications interface 112 can further include SCSI target adapters, network interface adapters, or any other suitable cards or adapters for converting electronic, optical, or wireless signals received over the cloud infrastructure 106 to a form suitable for use by the processing circuitry 114. The processing circuitry 114 (e.g., central processing unit (CPU)) can include a set of processing cores (e.g., CPU cores) configured to execute specialized software/firmware code, components, modules, and/or logic as program instructions out of the memory 116. The memory 116 can include volatile memory, such as random access memory (RAM) or any other suitable volatile memory, and nonvolatile memory, such as nonvolatile RAM (NVRAM) or any other suitable nonvolatile memory. The memory 116 can accommodate a variety of specialized software/firmware constructs including a failure detection, prediction, and remediation framework (the "framework") 118, as further described herein, as well as an operating system (OS), such as a Linux OS, Unix OS, Windows OS, or any other suitable OS.

Figure 2:
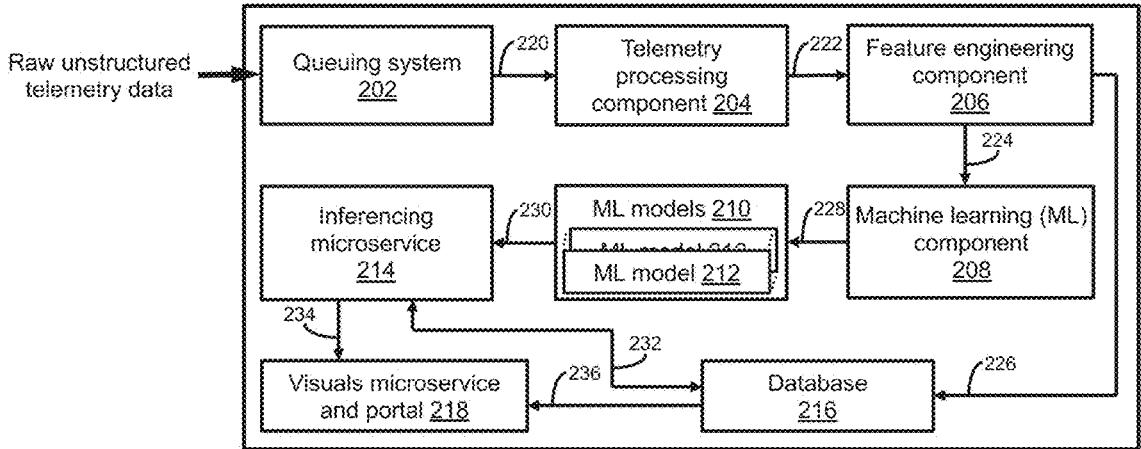
FIG. 2 is a block diagram of an exemplary failure detection, forecasting, and remediation framework (the "framework") that can be implemented in one or more analytics server computers (the "analytics server(s)") in the system environment of FIG. 1.

FIG. 2 depicts an illustrative embodiment of the framework 118, which can be implemented in the analytics server 108 of FIG. 1. As shown in FIG. 2, the framework 118 can encompass a plurality of executable software/firmware systems, components, and microservices, including a queuing system 202, a telemetry processing component 204, a feature engineering component 206, an ML component 208, an inferencing microservice 214, and a visuals microservice and portal 218. The framework 118 can also encompass at least one database 216. In one embodiment, the database 216 can be implemented as a PostgreSQL® database, a MongoDB® database, a DynamoDB® database, or any other suitable database.

During operation, the framework's queuing system 202 can collect (e.g., in real-time) raw unstructured telemetry data pertaining to a plurality of components (e.g., networking components, server components, storage disks/drives) of one or more of the plurality of IT systems 104.1, . . . , 104.m. The raw unstructured telemetry data can be specific to multiple different component domains of each IT system, such as a networking domain, a server domain, a storage disk/drive domain, and so on. In one embodiment, raw unstructured telemetry data specific to different IT system component domains can be collected at the queuing system 202 in response to one or more requests for the telemetry data. In another embodiment, raw unstructured telemetry data can be "pushed" to the queuing system 202, without requiring any request(s) to "pull" the telemetry data. For each IT system, the queuing system 202 can place raw unstructured telemetry data specific to each different IT system component domain in a separate data queue. For example, for the IT system 104.1, the queuing system 202 may place raw unstructured telemetry data specific to a first IT system component domain (e.g., storage disk/drive domain) in a first data queue, place raw unstructured telemetry data specific to a second IT system component domain (e.g., networking domain) in a second data queue, and so on. For example, the queuing system 202 may be implemented as a RabbitMQ® queuing system, a Kafka® queuing system, an ActiveMQ® queuing system, or any other suitable queuing system.

The framework's telemetry processing component 204 can use data streaming or batch processing to retrieve or extract, from separate data queues over a path 220, the raw unstructured telemetry data specific to multiple different component domains (e.g., networking domain, server domain, storage disk/drive domain) of each IT system. Having extracted the raw unstructured telemetry data from the separate data queues, the telemetry processing component 204 can clean the raw unstructured telemetry data, and, for each component domain of each IT system, transform the unstructured telemetry data specific to the IT system component domain into structured telemetry data.

The framework's feature engineering component 206 can receive, over a path 222, the structured telemetry data specific to each component domain of each IT system, and perform feature engineering on the structured telemetry data to obtain features (or attributes) relevant to component failures in the IT system component domain. For example, such feature engineering may include performing various tasks, such as data preprocessing, feature selection, dimensionality reduction, scaling, and so on, as well as integrating domain-specific knowledge with statistical and/or time-series analyses. Having obtained the features relevant to component failures in each component domain of each IT system, the features, and optionally the structured telemetry data from which the features were obtained, can be stored, over a path 226, in the framework's database 216.

The framework's ML component 208 can receive, over a path 224, the features relevant to component failures in the multiple different component domains of each IT system. For each IT system component domain, the ML component 208 can train, validate, and test an ML algorithm using at least some of the features information, and generate a customized ML model based on the ML algorithm. For example, based on certain component failure forecasting requirements of the IT system component domain, the ML component 208 may train a regression algorithm, a classification algorithm, or any other suitable supervised ML algorithm, and/or an anomaly detection algorithm or any other suitable unsupervised ML algorithm. Further, to enhance the performance of the customized ML models, the ML component 208 may employ various configuration techniques, such as cross-validation, hyperparameter tuning, and/or ensemble learning with centralized configuration management (e.g., GitHub®). In one embodiment, the customized ML models can be deployed as microservices in a containerized environment (e.g., Docker®, Kubernetes®), allowing each containerized microservice to be independently managed and scaled, as well as efficiently and dynamically integrated and orchestrated with other framework services, as needed and/or appropriate.

The framework's inferencing microservice 214 can access, over a path 232, a dataset of recently obtained features for each component domain of each IT system, and access, from among a plurality of customized ML models 210 over a path 230, a customized ML model 212 suitable for forecasting potential component failures in the IT system component domain. In response to processing the dataset using the customized ML model 212, the inferencing microservice 214 can forecast, by model inference, one or more potential component failures in the IT system component domain. The framework's visuals microservice and portal 218 can receive, over a path 234, information pertaining to the performance and/or forecasting results of each customized ML model, access, over a path 236, the features information used by each customized ML model to perform model inference, and provide, via a dashboard or web-based interface (e.g., Tableau®, Grafana®, Power BI®), real-time metrics and/or data visualizations for display on the displays 110.1, . . . , 110.*n* of the user computers 102.1, . . . , 102.*n*, respectively. By monitoring real-time metrics and/or data visualizations provided by the visuals microservice and portal 218, human users can gain valuable insights from the model inference performed by the customized ML models in the multiple different IT system component domains.

Figure 3:
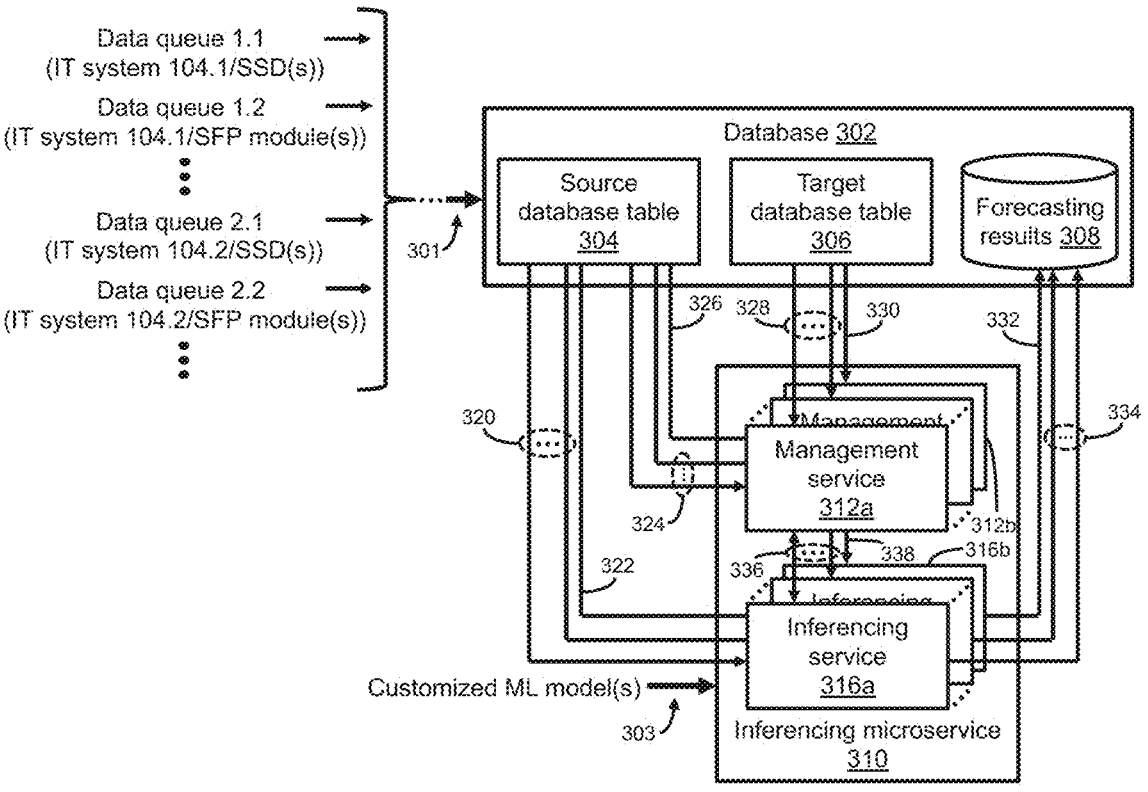
FIG. 3 is a block diagram of an exemplary database and inferencing microservice that can be implemented in the framework of FIG. 2.

The disclosed techniques for providing a unified or centralized framework for detection, forecasting, and remediation of IT system component failures will be further understood with reference to the following illustrative example, and FIGS. 1-3. In this example, it is assumed that the framework's queuing system 202 (see FIG. 2) collects (e.g., in real-time) raw unstructured telemetry data pertaining to storage disks/drives (e.g., SSDs) and networking components (e.g., small form factor pluggable (SFP) transceiver modules; "SFP module(s)") specific to storage disk/drive domains and networking domains, respectively, of a plurality of IT systems 104.1, 104.2. For example, the raw unstructured telemetry data specific to the storage disk/drive domains may include, for each IT system 104.1, 104.2, standard SMART (Self-Monitoring, Analysis and Reporting Technology) attribute data (e.g., ATA SMART attribute data, NVMe SMART attribute data), as well as telemetry data specific to platforms of the IT systems 104.1, 104.2, such as temperatures, power-on hours, error rates, and so on. Further, the raw unstructured telemetry data specific the networking domains may include, for each IT system 104.1, 104.2, a transmitter (Tx) temperature, an internally measured supply voltage, a Tx bias current, a Tx output power, and a received optical power.

FIG. 3 depicts illustrative embodiments of a database 302 and an inferencing microservice 310, each of which can be implemented in the framework 118 of FIGS. 1 and 2. As shown in FIG. 3, the inferencing microservice 310 can implement one or more inferencing services 316 (i.e., 316*a* . . . , 316*b*), each of which can have an associated management service 312 (i.e., 312*a* . . . , 312*b*). The database 302 can include a source database table 304, a target database table 306, and storage 308 for forecasting results obtained by the inferencing services 316. In this example, the queuing system 202 (see FIG. 2) places the raw unstructured telemetry data specific to the storage disk/drive domain of the IT system 104.1 in a data queue 1.1, and places the raw unstructured telemetry data specific to the networking domain of the IT system 104.1 in a data queue 1.2. Further, the queuing system 202 places the raw unstructured telemetry data specific to the storage disk/drive domain of the IT system 104.2 in a data queue 2.1, and places the raw unstructured telemetry data specific to the networking domain of the IT system 104.2 in a data queue 2.2. It is noted that the queuing system 202 can collect (e.g., in real-time) raw unstructured telemetry data specific to multiple different component domains of one, some, or all IT systems in a customer install base, and place the collected telemetry data specific to the different IT system component domains in separate data queues.

In this example, the framework's telemetry processing component 204 (see FIG. 2) extracts the raw unstructured telemetry data from each of the data queues 1.1, 1.2, 2.1, 2.2, cleans the raw unstructured telemetry data, and transforms the unstructured telemetry data into structured telemetry data. The framework's feature engineering component 206 (see FIG. 2) receives the structured telemetry data specific to the storage disk/drive domains and networking domains of the IT systems 104.1, 104.2, and, for each IT system component domain of each IT system 104.1, 104.2, performs feature engineering on the structured telemetry data to obtain features (or attributes) relevant to component failures in the IT system component domain. Having obtained the features relevant to component failures in each component domain of each IT system 104.1, 104.2, the features, and optionally the structured telemetry data from which the features were obtained, are stored, over a path 301 (see FIG. 3), in the source database table 304.

Based on the amounts of raw unstructured telemetry data collected and contained in the data queues 1.1, 1.2, 2.1, 2.2 of the queuing system 202, one or more of the systems, components, and/or microservices of the framework 118 can be automatically scaled up (or down) to perform telemetry data processing efficiently in a parallel fashion. For example, if one hundred (100) raw unstructured telemetry data items were collected from the customer install base at a certain time, and contained in separate data queues of the queuing system 202, then one or more of the systems, components, and/or microservices of the framework 118 may be automatically scaled up to ten (10) instances or any other suitable number of instances, as needed and/or appropriate. As a further example, if one million (1,000,000) raw unstructured telemetry data items were collected from the customer install base at a certain time, and contained in separate data queues of the queuing system 202, then one or more of the systems, components, and/or microservices of the framework 118 may be automatically scaled up to ten thousand (10,000) instances or any other suitable number of instances, as needed and/or appropriate.

In this example, it is assumed that a greater amount of raw unstructured telemetry data for SSDs in the storage disk/drive domain of the IT system 104.1 is collected and contained at a certain time in the data queue 1.1, while a lesser amount of raw unstructured telemetry data for SFP modules in the networking domain of the IT system 104.1 is collected and contained in the data queue 1.2. In response to the different amounts of raw unstructured telemetry data collected and contained in the data queues 1.1, 1.2, instances of the inferencing service 316 and the management service 312 are automatically scaled to efficiently process the telemetry data. It is noted that instances of the inferencing service 316 and the management service 312 can also be automatically scaled to efficiently process telemetry data from the data queues 2.1, 2.2, as well as from any additional data queues that may need to be generated for collecting raw unstructured telemetry data from the customer install base. For purposes of clarity, however, the automatic scaling of instances of the inferencing service 316 and the management service 312 will be described herein only with regard to the different amounts of raw unstructured telemetry data collected and contained in the data queues 1.1, 1.2.

In response to the greater amount of raw unstructured telemetry data for SSDs collected and contained in the data queue 1.1, an instance of the inferencing service (illustrated at reference numeral 316a; see FIG. 3) and its associated instance of the management service (illustrated at reference numeral 312a; see FIG. 3) are automatically scaled up (e.g., from one (1) instance to ten (10) instances) to efficiently process the telemetry data contained in the data queue 1.1. Further, due to the lesser amount of raw unstructured telemetry data for SFP modules contained in the data queue 1.2, an instance of the inferencing service (illustrated at reference numeral 316b; see FIG. 3) and its associated instance of the management service (illustrated at reference numeral 312b; see FIG. 3) are used to process the telemetry data contained in the data queue 1.2, without any further scaling of the inferencing and management services 316, 312. In this way, instances of the inferencing service 316 and the management service 312 can be scaled (up or down) or not scaled, based on the amounts of raw unstructured telemetry data collected and contained in the separate data queues 1.1, 1.2.

As shown in FIG. 3, recently obtained features relevant to failures of SSDs in the storage disk/drive domain of the IT system 104.1 are accessed, from the source database table 304 over paths 320 (see FIG. 3), and distributed across the scaled-up inferencing service instances 316a. Data pertaining to these recently obtained features relevant to SSD failures are also accessed, from the source database table 304 over paths 324 (see FIG. 3), and distributed across the scaled-up management service instances 312a. For example, the inferencing service instances 316a and their associated management service instances 312a may communicate with each other (e.g., using RabbitMQ®), over paths 336 (see FIG. 3), to schedule inferencing tasks, track and monitor storage disk/drive feature data, schedule retraining of a corresponding customized ML model, and so on. In addition, recently obtained features relevant to failures of SFP modules in the networking domain of the IT system 104.1 are accessed, from the source database table 304 over a path 322 (see FIG. 3), and received at the inferencing service instance 316b. Data pertaining to these recently obtained features relevant to SFP module failures are also accessed, from the source database table 304 over a path 326 (see FIG. 3), and received at the management service instance 312b. For example, the inferencing service instance 316b and its associated management service instance 312b may communicate with each other (e.g., using RabbitMQ®), over a path 338 (see FIG. 3), to schedule inferencing tasks, track and monitor SFP module feature data, schedule retraining of a corresponding customized ML model, and so on.

Having accessed, from the source database table 304, the recently obtained features relevant to SSD failures in the storage disk/drive domain of the IT system 104.1, the inferencing service instances 316a access, over a path 303 (see FIG. 3), a corresponding customized ML model from among the ML models 210 (see FIG. 2), and forecast, by model inference, potential SSD failures in the IT system 104.1. As described herein, based on certain component failure forecasting requirements of an IT system component domain, the ML component 208 (see FIG. 2) can train a regression algorithm, a classification algorithm, or any other suitable supervised ML algorithm. As such, the customized ML model accessed by the inferencing service instances 316a may be configured to produce values for one or more target (or predictor) variables, information pertaining to which may be accessed, from the target database table 306 over paths 328 (see FIG. 3), by the management service instances 312a. Upon forecasting zero, one, or more potential SSD failures in the storage disk/drive domain of the IT system 104.1, the inferencing service instances 316a store, over paths 334 (see FIG. 3), forecasting results in the database storage 308.

Similarly, having accessed, from the source database table 304, the recently obtained features relevant to SFP module failures in the networking domain of the IT system 104.1, the inferencing service instance 316b accesses, over the path 303, a corresponding customized ML model from among the ML models 210, and forecasts, by model inference, potential SFP module failures for the IT system 104.1. Like the customized ML model accessed by the inferencing service instances 316a, the customized ML model accessed by the inferencing service instance 316b may be a supervised ML model configured to produce values for one or more target (or predictor) variables, information pertaining to which may be accessed, from the target database table 306 over a path 330 (see FIG. 3), by the management service instance 312b. Upon forecasting zero, one, or more potential SFP module failures in the networking domain of the IT system 104.1, the inferencing service instance 316b stores, over a path 332 (see FIG. 3), forecasting results in the database storage 308.

As illustrated in this example, the queuing system 202 of the framework 118 (see FIGS. 1 and 2) can collect (e.g., in real-time) raw unstructured telemetry data specific to multiple different component domains of IT systems in a customer install base, and place the collected telemetry data specific to the different IT system component domains in separate data queues. Further, based on the amounts of raw unstructured telemetry data collected and contained in the separate data queues, various systems, components, and/or microservices of the framework 118 can be automatically scaled (up or down) or not scaled, as needed and/or appropriate, and potential failures of IT system components can be forecasted, by model inference, using customized ML models trained for forecasting potential component failures in the different IT system component domains. In this way, telemetry data processing, for one, some, or all IT systems in the customer install base, can be performed with high levels of efficiency and accuracy.

Figure 4:
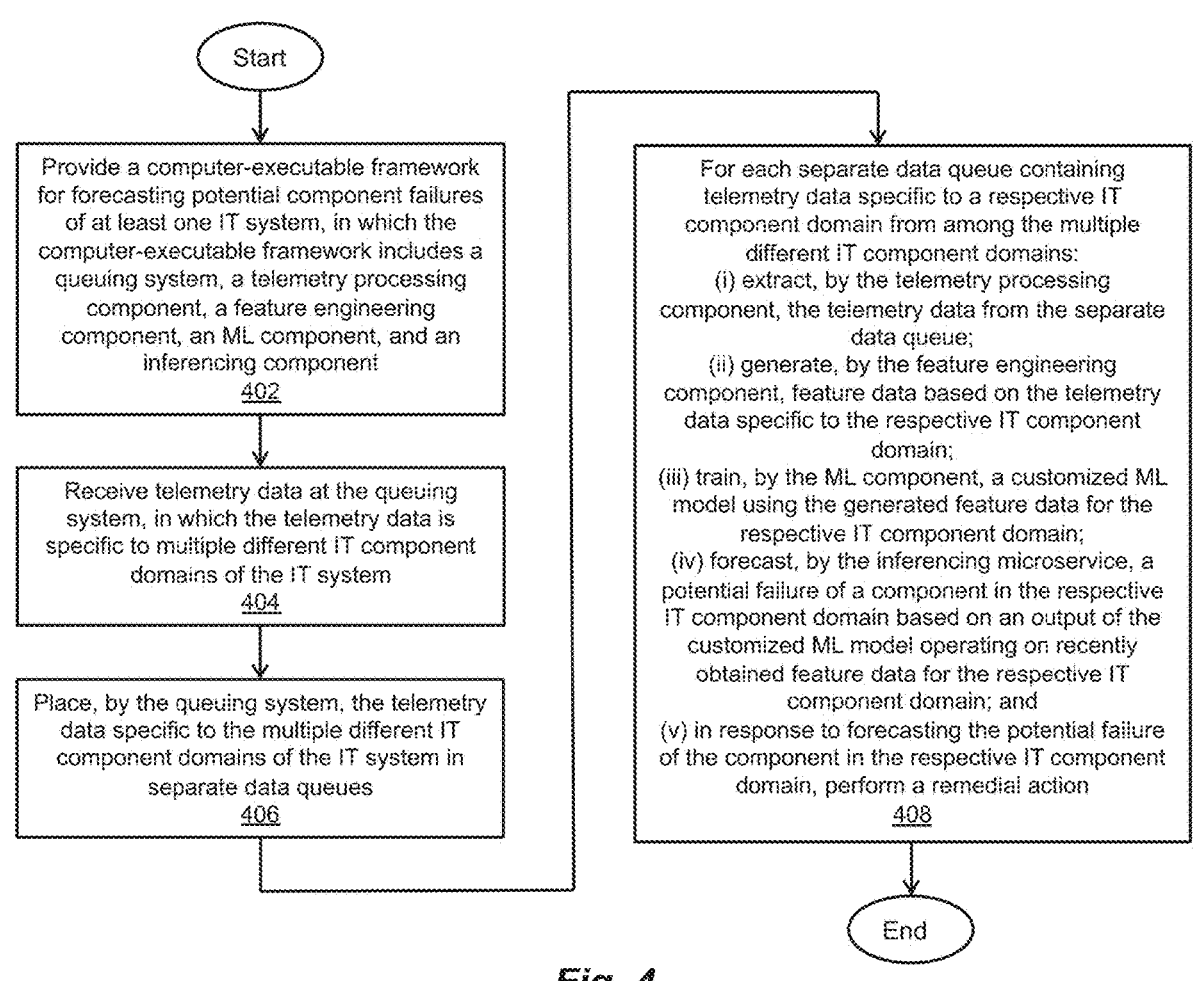
FIG. 4 is a flow diagram of an exemplary method of providing a unified or centralized framework for detection, forecasting, and remediation of IT system component failures that combines the use of domain-specific telemetry data with customized ML models.

An exemplary method of providing a unified or centralized framework for detection, forecasting, and remediation of IT system component failures, which combines the use of domain-specific telemetry data with customized ML models, is described below with reference to FIG. 4. As depicted in block 402, a computer-executable framework for forecasting potential component failures of at least one IT system is provided, in which the computer-executable framework includes a queuing system, a telemetry processing component, a feature engineering component, an ML component, and an inferencing microservice. As depicted in block 404, telemetry data is received at the queuing system, in which the telemetry data is specific to multiple different IT component domains of the IT system. As depicted in block 406, the telemetry data specific to the multiple different IT component domains of the IT system are placed in separate data queues. As depicted in block 408, for each separate data queue containing telemetry data specific to a respective IT component domain from among the multiple different IT component domains: (i) the telemetry data is extracted, by the telemetry processing component, from the separate data queue; (ii) feature data is generated, by the feature engineering component, based on the telemetry data specific to the respective IT component domain; (iii) a customized ML model is trained, by the ML component, using the generated feature data for the respective IT component domain; (iv) a potential failure of a component in the respective IT component domain is forecasted, by the inferencing microservice, based on an output of the customized ML model, which operates on recently obtained feature data for the respective IT component domain; and (v) in response to forecasting the potential failure of the component in the respective IT component domain, a remedial action is performed. For example, the remedial action may include notifying, via the framework's visuals microservice and portal, a human user of the potential IT system component failure.

Having described the above illustrative embodiments, various alternative embodiments and/or variations may be made and/or practiced. For example, it was described herein that the system environment 100 can include the plurality of IT systems 104.1, . . . , 104.m communicably coupled, over the cloud infrastructure 106, to the analytics server(s) 108. In one embodiment, the analytics server(s) 108 can be deployed and maintained locally at a dark site or other such site not connected to a public/private cloud or network, and can use the disclosed framework to forecast potential component failures of one or more IT systems locally at the dark site.

It was further described herein that the framework's inferencing microservice 214 can access a dataset of recently obtained features for each component domain of an IT system, access a customized ML model 212 suitable for forecasting potential component failures in the IT system component domain, process the dataset using the customized ML model 212, and forecast, by model inference, one or more potential component failures in the IT system component domain. In one embodiment, a management service of the disclosed framework can be configured to perform statistical processes for defining bounds for rates of false positive forecasts and false negative forecasts in particular IT system component domains. In this embodiment, if a rate of false positive/negative forecasts in an IT system component domain is determined (e.g., using z-scores) to fall outside statistically defined bounds, then the management service can trigger a retraining of the customized ML model used to perform model inference in the IT system component domain, as well as provide a notification (e.g., via a REST API) of the model retraining to a human user to confirm use of the retrained ML model.

It was further described herein that the framework's visuals microservice and portal 218 can receive information pertaining to the performance and/or forecasting results of each customized ML model, access features information used by each customized ML model to perform model inference, and provide, via a dashboard or web-based interface (e.g., Tableau®, Grafana®, Power BI®), real-time metrics and/or data visualizations for display on the displays 110.1, . . . , 110.n of the user computers 102.1, . . . , 102.n, respectively. In one embodiment, the dashboard or web-based interface can provide information pertaining to the amount of telemetry data items being processed in an IT system component domain, the false positive/negative forecast rates in the IT system component domain, the number of components in the IT system component domain forecasted to potentially fail within a specified time period, an estimated number of days left for replacing a component in the IT system component domain, a recommended remedial action (e.g., replace a particular component in an IT system component domain, check other components in the IT system component domain), and so on.

It was further described herein that the disclosed framework can encompass at least one database 216, such as a PostgreSQL® database, a MongoDB® database, a DynamoDB® database, or any other suitable database. In one embodiment, the disclosed framework can also encompass a data lake house to provide scalable and distributed storage of large volumes of telemetry data for archival and/or model training/retraining purposes. In one embodiment, the data lake house can be implemented using the Apache Spark™ unified analytics engine for large scale data processing.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any human, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LU), a logical volume (LV), a logical device, a physical device, and/or a storage medium.

As employed herein, the term "LU" may refer to a logical entity provided by a storage system for accessing data from the storage system and may be used interchangeably with a logical volume (LV). The term "LUN" may refer to a logical unit number for identifying a logical unit (LU), a virtual disk, or a virtual LU.

As employed herein, the term "physical storage unit" may refer to a physical entity, such as a storage disk or drive, or an array of storage disks or drives, for storing data in storage locations accessible at addresses. The term "physical storage unit" may be used interchangeably with the term "physical volume."

As employed herein, the term "storage medium" may refer to a hard disk drive (HDD), solid state drive (SSD), or flash storage, a combination of HDDs, SSDs, and/or flash storage, a combination of HDDs, SSDs, flash storage, and/or other storage disks, drives, or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request, such as a read request or a write request.

As employed herein, the terms "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
   providing a computer-executable framework for forecasting potential component failures of at least one information technology (IT) system, the computer-executable framework including a queuing system, a telemetry processing component, a feature engineering component, a machine learning (ML) component, and an inferencing microservice;
   collecting, in real-time at the queuing system, telemetry data specific to multiple different IT system component domains of the at least one IT system;
   placing, in separate data queues of the queuing system, the telemetry data specific to the multiple different IT system component domains of the at least one IT system;
   for each separate data queue containing telemetry data specific to a respective IT system component domain from among the multiple different IT system component domains:
      extracting, by the telemetry processing component, the telemetry data from the separate data queue;
      generating, by the feature engineering component, feature data based on the extracted telemetry data specific to the respective IT system component domain;
      forecasting, by the inferencing microservice, a potential failure of a component in the respective IT system component domain based on an output of a customized ML model, the customized ML model operating on first obtained feature data for the respective IT system component domain, and the customized ML model being trained using the generated feature data for the respective IT system component domain; and
      in response to forecasting the potential failure of the component in the respective IT system component domain, performing a remedial action,
   wherein the collecting of the telemetry data specific to the multiple different IT system component domains of the at least one IT system includes collecting, in real-time at the queuing system, a greater amount of first telemetry data specific to a first IT system component domain, and collecting, in real-time at the queuing system, a lesser amount of second telemetry data specific to a second IT system component domain, and
   wherein the forecasting of the potential failure of the component in the respective IT system component domain includes forecasting, by a first instance of the inferencing microservice, a potential failure of a first component in the first IT system component domain, and forecasting, by a second instance of the inferencing microservice, a potential failure of a second component in the second IT system component domain;

automatically scaling-up the first instance of the inferencing microservice for forecasting the potential failure of the first component in the first IT system component domain based on the greater amount of the first telemetry data; and automatically scaling-down the second instance of the inferencing microservice for forecasting the potential failure of the second component in the second IT system component domain based on the lesser amount of the second telemetry data, wherein the method is performed by processing circuitry coupled to a memory.

2. The method of claim 1 wherein the placing of the telemetry data specific to the multiple different IT system component domains of the at least one IT system in separate data queues includes placing the first telemetry data specific to the first IT system component domain in a first data queue of the queuing system, and placing the second telemetry data specific to the second IT system component domain in a second data queue of the queuing system.

3. The method of claim 2 wherein the extracting of the telemetry data includes extracting the first telemetry data from the first data queue, and extracting the second telemetry data from the second data queue.

4. The method of claim 3 wherein the generating of the feature data includes generating first feature data based on the first telemetry data specific to the first IT system component domain, and generating second feature data based on the second telemetry data specific to the second IT system component domain.

5. The method of claim 4 wherein the customized ML model is trained using a first customized ML model that is trained using the first feature data for the first IT system component domain, and a second customized ML model that is trained using the second feature data for the second IT system component domain.

6. The method of claim 5 wherein the forecasting of the potential failure of the component in the respective IT system component domain includes forecasting, by the first instance of the inferencing microservice, the potential failure of the first component in the first IT system component domain based on an output of the first customized ML model, the first customized ML model operating on first obtained feature data for the first IT system component domain, and forecasting, by the second instance of the inferencing microservice, the potential failure of the second component in the second IT system component domain based on an output of the second customized ML model, the second customized ML model operating on first obtained feature data for the second IT system component domain.

7. The method of claim 6 wherein the placing of the first telemetry data specific to the first IT system component domain in the first data queue includes placing the greater amount of the first telemetry data in the first data queue, wherein the placing of the second telemetry data specific to the second IT system component domain in the second data queue includes placing the lesser amount of the second telemetry data in the second data queue.

8. The method of claim 7 wherein the forecasting of the potential failure of the first component in the first IT system component domain includes forecasting, by the scaled-up first instance of the inferencing microservice, the potential failure of the first component in the first IT system component domain.

9. The method of claim 8 wherein the forecasting of the potential failure of the second component in the second IT system component domain includes forecasting, by the scaled-down second instance of the inferencing microservice, the potential failure of the second component in the second IT system component domain.

10. A system comprising:

a memory configured to store program instructions for a framework for forecasting potential component failures of at least one information technology (IT) system, the framework including a queuing system, a telemetry processing component, a feature engineering component, a machine learning (ML) component, and an inferencing microservice; and processing circuitry configured to execute the program instructions out of the memory to:

collect, in real-time at the queuing system, telemetry data specific to multiple different IT system component domains of the at least one IT system;

place, in separate data queues of the queuing system, the telemetry data specific to the multiple different IT system component domains of the at least one IT system;

for each separate data queue containing telemetry data specific to a respective IT system component domain from among the multiple different IT system component domains:

extract, by the telemetry processing component, the telemetry data from the separate data queue;

generate, by the feature engineering component, feature data based on the extracted telemetry data specific to the respective IT system component domain;

forecast, by the inferencing microservice, a potential failure of a component in the respective IT system component domain based on an output of a customized ML model, the customized ML model operating on first obtained feature data for the respective IT system component domain, and the customized ML model being trained using the generated feature data for the respective IT system component domain; and in response to forecasting the potential failure of the component in the respective IT system component domain, perform a remedial action, wherein collecting the telemetry data specific to the multiple different IT system component domains of the at least one IT system includes collecting, in real-time at the queuing system, a greater amount of first telemetry data specific to a first IT system component domain in a first data queue of the queuing system, and collecting, in real-time at the queuing system, a lesser amount of second telemetry data specific to a second IT system component domain in a second data queue of the queuing system, and wherein forecasting the potential failure of the component in the respective IT system component domain includes forecasting, by a first instance of the inferencing microservice, a potential failure of a first component in the first IT system component domain, and forecasting, by a second instance of the inferencing microservice, a potential failure of a second component in the second IT system component domain;

automatically scale-up the first instance of the inferencing microservice for forecasting the potential failure of the first component in the first IT system component domain based on the greater amount of the first telemetry data in the first data queue; and automatically scale-down the second instance of the inferencing microservice for forecasting the potential failure of the second component in the second IT system component domain.

11. The system of claim 10 wherein the processing circuitry is configured to execute the program instructions out of the memory to:

place the first telemetry data specific to the first IT system component domain in a first data queue of the queuing system; and place the second telemetry data specific to the second IT system component domain in a second data queue of the queuing system.

12. The system of claim 11 wherein the processing circuitry is configured to execute the program instructions out of the memory to:

extract the first telemetry data from the first data queue; and extract the second telemetry data from the second data queue.

13. The system of claim 12 wherein the processing circuitry is configured to execute the program instructions out of the memory to:

generate first feature data based on the first telemetry data specific to the first IT system component domain; and generate second feature data based on the second telemetry data specific to the second IT system component domain.

14. The system of claim 13 wherein the customized ML model is trained using a first customized ML model that is trained using the first feature data for the first IT system component domain, and a second customized ML model that is trained using the second feature data for the second IT system component domain.

15. The system of claim 14 wherein the processing circuitry is configured to execute the program instructions out of the memory to:

forecast, by the first instance of the inferencing microservice, the potential failure of the first component in the first IT system component domain based on an output of the first customized ML model, the first customized ML model operating on first obtained feature data for the first IT system component domain; and forecast, by the second instance of the inferencing microservice, the potential failure of the second component in the second IT system component domain based on an output of the second customized ML model, the second customized ML model operating on first obtained feature data for the second IT system component domain.

16. The system of claim 15 wherein the processing circuitry is configured to execute the program instructions out of the memory to:

place the greater amount of the first telemetry data in the first data queue;

place the lesser amount of the second telemetry data in the second data queue.

17. The system of claim 16 wherein the processing circuitry is configured to execute the program instructions out of the memory to:

forecast, by the scaled-up first instance of the inferencing microservice, the potential failure of the first component in the first IT system component domain.

18. The system of claim 17 wherein the processing circuitry is configured to execute the program instructions out of the memory to:

forecast, by the scaled-down second instance of the inferencing microservice, the potential failure of the second component in the second IT system component domain.

19. A computer program product including a set of non-transitory, computer-readable media having program instructions that, when executed by processing circuitry, cause the processing circuitry to perform a method comprising:

providing a computer-executable framework for forecasting potential component failures of at least one information technology (IT) system, the computer-executable framework including a queuing system, a telemetry processing component, a feature engineering component, a machine learning (ML) component, and an inferencing microservice;

collecting, in real-time at the queuing system, telemetry data specific to multiple different IT system component domains of the at least one IT system;

placing, in separate data queues of the queuing system, the telemetry data specific to the multiple different IT system component domains of the at least one IT system;

for each separate data queue containing telemetry data specific to a respective IT system component domain from among the multiple different IT system component domains:

extracting, by the telemetry processing component, the telemetry data from the separate data queue;

generating, by the feature engineering component, feature data based on the extracted telemetry data specific to the respective IT system component domain;

forecasting, by the inferencing microservice, a potential failure of a component in the respective IT system component domain based on an output of a customized ML model, the customized ML model operating on first obtained feature data for the respective IT system component domain, and the customized ML model being trained using the generated feature data for the respective IT system component domain; and in response to forecasting the potential failure of the component in the respective IT system component domain, performing a remedial action, wherein the collecting of the telemetry data specific to the multiple different IT system component domains of the at least one IT system includes collecting, in real-time at the queuing system, a greater amount of first telemetry data specific to a first IT system component domain, and collecting, in real-time at the queuing system, a lesser amount of second telemetry data specific to a second IT system component domain, and wherein the forecasting of the potential failure of the component in the respective IT system component domain includes forecasting, by a first instance of the inferencing microservice, a potential failure of a first component in the first IT system component domain, and forecasting, by a second instance of the inferencing microservice, a potential failure of a second component in the second IT system component domain;

automatically scaling-up the first instance of the inferencing microservice for forecasting the potential failure of the first component in the first IT system component domain based on the greater amount of the first telemetry data; and automatically scaling-down the second instance of the inferencing microservice for forecasting the potential failure of the second component in the second IT system component domain based on the lesser amount of the second telemetry data.

20. The computer program product of claim 19 wherein the method comprises:

placing the first telemetry data specific to the first IT system component domain in a first data queue of the queuing system;

placing the second telemetry data specific to the second IT system component domain in a second data queue of the queuing system, wherein the placing of the first telemetry data specific to the first IT system component domain in the first data queue includes placing the greater amount of the first telemetry data in the first data queue, and wherein the placing of the second telemetry data specific to the second IT system component domain in the second data queue includes placing the lesser amount of the second telemetry data in the second data queue.

* * * * *